United States Patent
Xu et al.

(10) Patent No.: US 11,477,065 B2
(45) Date of Patent: *Oct. 18, 2022

(54) METHOD AND APPARATUS FOR CODE BLOCK DIVISION

(71) Applicant: ZTE Corporation, Guangdong (CN)

(72) Inventors: Jin Xu, Guangdong (CN); Jun Xu, Guangdong (CN); Liguang Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,875

(22) Filed: Jul. 6, 2020

(65) Prior Publication Data

US 2020/0336351 A1 Oct. 22, 2020

Related U.S. Application Data

(63) Continuation of application No. 15/566,771, filed as application No. PCT/CN2016/078586 on Apr. 6, 2016, now Pat. No. 10,708,099.

(30) Foreign Application Priority Data

Apr. 15, 2015 (CN) .......................... 201510179118.X

(51) Int. Cl.
*H04L 27/26* (2006.01)
*H04L 5/00* (2006.01)
*H04L 1/00* (2006.01)

(52) U.S. Cl.
CPC .......... *H04L 27/2608* (2013.01); *H04L 1/009* (2013.01); *H04L 1/0083* (2013.01);
(Continued)

(58) Field of Classification Search
None
See application file for complete search history.

(56) References Cited

U.S. PATENT DOCUMENTS 8,356,232 B2 1/2013 Blankenship et al.
8,607,125 B2 12/2013 Xu et al.
(Continued)

FOREIGN PATENT DOCUMENTS

CN 1808955 A 7/2006
CN 101005334 A 7/2007
(Continued)

OTHER PUBLICATIONS

European Search Report for EP Application No. 16779550, dated Mar. 23, 2018, 12 pages.
(Continued)

*Primary Examiner* — Gregory B Sefcheck
*Assistant Examiner* — Suk Jin Kang
(74) *Attorney, Agent, or Firm* — Perkins Coie LLP

(57) ABSTRACT

A method and apparatus for code block division are provided. The method may include the following acts. A reference information block length of a code block is determined according to an obtained division related parameter. A maximum information block length is determined according to the reference information block length and a hardware parameter. A Transport Block (TB) having a length greater than the maximum information block length may be divided into two or more code blocks according to the obtained division related parameter, the hardware parameter and the determined maximum information block length. An information length after code block division is less than the determined maximum information block length.

12 Claims, 6 Drawing Sheets

(52) U.S. Cl.
CPC .......... *H04L 5/0044* (2013.01); *H04L 5/0046* (2013.01); *H04L 1/0042* (2013.01)

(56) References Cited

U.S. PATENT DOCUMENTS

| | | | |
|---|---|---|---|
| 9,621,316 | B2 | 4/2017 | Kim et al. |
| RE46,810 | E * | 4/2018 | Jin .................. H04L 27/0008 |
| 10,320,419 | B2 | 6/2019 | Xu et al. |
| 10,708,099 | B2 | 7/2020 | Xu et al. |
| 2002/0103953 | A1 | 8/2002 | Das et al. |
| 2003/0207696 | A1 | 11/2003 | Willenegger et al. |
| 2004/0078392 | A1 | 4/2004 | Morita |
| 2008/0098273 | A1* | 4/2008 | Blankenship ......... H03M 13/05 714/746 |
| 2008/0141103 | A1 | 6/2008 | Miyazaki et al. |
| 2008/0288850 | A1 | 11/2008 | Rhee et al. |
| 2009/0199066 | A1* | 8/2009 | Kim ...................... H04L 1/0061 714/752 |
| 2009/0228771 | A1 | 9/2009 | Shasha |
| 2010/0208680 | A1* | 8/2010 | Nam ...................... H04L 5/0023 370/329 |
| 2010/0251082 | A1 | 9/2010 | Cheng et al. |
| 2010/0257425 | A1 | 10/2010 | Yue et al. |
| 2010/0287441 | A1* | 11/2010 | Seo ...................... G06F 11/1004 714/755 |
| 2011/0142168 | A1 | 6/2011 | Yano et al. |
| 2011/0154154 | A1 | 6/2011 | Seo et al. |
| 2011/0261775 | A1* | 10/2011 | Kim ...................... H04L 1/0057 370/329 |
| 2011/0274059 | A1* | 11/2011 | Brown ................. H04L 5/0064 370/329 |
| 2012/0311397 | A1* | 12/2012 | Kim ...................... H04L 1/0065 714/752 |
| 2012/0311414 | A1 | 12/2012 | Kim et al. |
| 2013/0019145 | A1 | 1/2013 | Kim et al. |
| 2013/0252624 | A1 | 9/2013 | Pajukoski et al. |
| 2014/0185425 | A1* | 7/2014 | Kim ...................... H04B 7/0456 370/203 |
| 2014/0198758 | A1* | 7/2014 | Nimbalker ............ H04L 1/1835 370/329 |
| 2014/0219386 | A1 | 8/2014 | Kim et al. |
| 2014/0229789 | A1 | 8/2014 | Richardson |
| 2014/0304574 | A1 | 10/2014 | Seo et al. |
| 2015/0146644 | A1 | 5/2015 | Kim et al. |
| 2016/0044534 | A1 | 2/2016 | Kim et al. |
| 2016/0156432 | A1* | 6/2016 | Seo ...................... H04L 1/0078 714/807 |
| 2016/0204844 | A1* | 7/2016 | Sandberg ............ H04L 25/021 370/252 |
| 2018/0013477 | A1* | 1/2018 | Kim ........................ H04B 7/06 |
| 2018/0098243 | A1 | 4/2018 | Kim et al. |
| 2018/0278370 | A1 | 9/2018 | Jeong et al. |
| 2019/0207703 | A1* | 7/2019 | Roh ...................... H04L 1/0041 |
| 2020/0235759 | A1 | 7/2020 | Ye et al. |

FOREIGN PATENT DOCUMENTS

| | | | |
|---|---|---|---|
| CN | 101217337 | A | 7/2008 |
| CN | 101867440 | A | 10/2010 |
| CN | 102025441 | A | 4/2011 |
| CN | 102377437 | A | 3/2012 |
| CN | 102412842 | A | 4/2012 |
| CN | 102594492 | A | 7/2012 |
| CN | 104426553 | A | 3/2015 |
| CN | 104868925 | A | 8/2015 |
| EP | 1211839 | A2 | 6/2002 |
| EP | 2086143 | A2 | 8/2009 |
| JP | 2002-199014 | A | 7/2002 |
| JP | 2005-525032 | A | 8/2005 |
| JP | 2010-536305 | A | 11/2010 |
| JP | 2011-504038 | A | 1/2011 |
| JP | 2012-516621 | A | 7/2012 |
| KR | 20140123397 | A | 10/2014 |
| WO | 2009/022874 | A1 | 2/2009 |
| WO | 2009/096658 | A1 | 8/2009 |
| WO | 2010/093194 | A2 | 8/2010 |
| WO | 2010118592 | A1 | 10/2010 |
| WO | 2014007539 | A1 | 1/2014 |

OTHER PUBLICATIONS

International Search Report and Written Opinion for International Patent Application No. PCT/CN2016/078586, dated Jun. 27, 2016, 7 pages.

Ericsson: "Correction of reference measurement channel for 2048 kbps", 3GPP Draft; R4-020376, 3rd Generation Partnership Project (3GPP), Mobile Competence Centre; 650, Route Des Lucioles ; F-06921 Sophia-Antipolis Cedex; France, vol. RAN WG4, No. Sophia Antipolis, France; Jan. 28, 2002, Jan. 28, 2002 (Jan. 28, 2002), XP050170230, [retrieved on Jan. 28, 2002], 2 pages.

European Search Report for EP Application No. 20201352, dated Apr. 16, 2021, 12 pages.

Yan et al., "An Efficient LDPC Encoder Scheme with Low-power Low-parallel," Journal of Electronics & Information Technology, vol. 38, No. 9, Sep. 2016, DOI: 10.11999/JEIT 151362, 6 pages, English abstract included.

CATT, "Design of LDPC codes for eMBB data," 3GPP TSG RAN WG1 Meeting #88, Athens, Greece, Feb. 13-17, 2017, R1-1702107, 6 pages.

Xie, "Design of Rate-compatible Protograph-based LDPC Codes with Mixed Circulants," 2010 6th International Symposium on Turbo Codes & Iterative Information Processing, Sep. 28, 2010, 5 pages.

International Search Report and Written Opinion for International Patent Application No. PCT/CN2017/085786, dated Dec. 27, 2017, 12 pages.

Japanese Office Action dated May 20, 2020 for Japanese Patent Application No. 2017-551222, filed on Apr. 6, 2016 (17 pages).

Japanese Office Action dated Nov. 9, 2021 for Japanese Patent Application No. 2020-151080, filed on Apr. 6, 2016 (16 pages).

3GPP Technical Specification, "LTE; Evolved Universal Terrestrial Radio Access (E-UTRA); Multiplexing and channel coding" ETSI TS 136.212 V12.4.0, Mar. 2015, (96 pages).

* cited by examiner

METHOD AND APPARATUS FOR CODE BLOCK DIVISION

CROSS REFERENCE TO RELATED APPLICATIONS

This patent document is a continuation of and claims priority to U.S. patent application Ser. No. 15/566,771, filed on Oct. 16, 2017, which is a national stage under 35 U.S.C. 371 of International Patent Application No. PCT/CN2016/078586, filed on Apr. 6, 2016, which claims the benefit of priority of Chinese Patent Application No. 201510179118.X, filed on Apr. 15, 2015. The entire contents of the before-mentioned patent applications are incorporated by reference as part of the disclosure of this application.

TECHNICAL FIELD

The disclosure relates to, but is not limited to, a communication encoding technology, in particular to a method and apparatus for code block division.

BACKGROUND

FIG. 1 is a structure diagram of a digital communication system. As shown in FIG. 1, the digital communication system may include a transmitting terminal and a receiving terminal, and the transmitting terminal and the receiving terminal may communicate with each other through a channel. Generally, the transmitting terminal may mainly include: an information source, an information source encoder, a channel encoder and a modulator. The receiving terminal may mainly include: a demodulator, a channel decoder, an information source decoder and an information sink. The main function of the encoder is: introducing redundant information in an information bit according to certain rules, so that the channel decoder of the receiving terminal may correct, to some extent, error codes generating when information is transmitted in a channel.

Baseband processing plays an important role in wireless interface technologies. The baseband processing before physical channel mapping is mainly the processing of channel encoding chain in the channel encoder. FIG. 2 is a flowchart of processing of channel encoding chain. As shown in FIG. 2, the processing of channel encoding chain is: performing code block division to an input Transport Block (TB), namely dividing the TB entering the channel encoder into code blocks according to the size of the maximum code block. The TB is a basic input of the channel encoding chain. Generally, data of one TB may be processed by the same encoding and modulating mode. Operations like Cyclic Redundancy Check (CRC) adding, channel encoding, rate matching, modulation, and physical channel mapping may be performed on multiple obtained code blocks.

FIG. 3 is a schematic diagram of code block division. As shown in FIG. 3, in an encoding process of a channel encoder, the channel encoder may divide the information bit of the TB into the encoding bocks with a certain length. In FIG. 3, for example, the TB may be divided into the code block 1, the code block 2 and the code block 3. Generally, the bigger the code block, the better the error-correcting performance. But if the code block is big, encoding and decoding complexity and decoding delay time may increase. Therefore, when a channel encoder is designed, it may be suggested to limit the size of the maximum code block, that is, a maximum value of a maximum code block may be set. Because an allowable size of the maximum code block may be provided for the channel encoding, it may be needed to divide one TB into multiple code blocks before channel encoding can be performed. At present, in the process of dividing the TB into multiple code blocks (namely a code block division technology), it may be needed to divide a TB into multiple code blocks with roughly the same size. For example, in a 3rd Generation Partnership Project (3GPP) Long Term Evolution (LTE) and LET-Advanced (LTE-A) system, the code block division may be performed by taking 6144 bits as a unit. When the length of the TB (including the CRC) is greater than 6144 bits, one TB may be divided into multiple code blocks. Moreover, because the length of the code block and the length of the CRC is required to match a code length supported by a turbo channel encoder, and the code blocks not matching the code length supported by the channel encoder cannot be directly encoded, so it may also be needed to add filling bits to these code blocks.

The LTE and LTE-A system is a system based on Orthogonal Frequency Division Multiplexing (OFDM). In an OFDM system, a physical time frequency Resource Block (RB), which may be called RB for short, is a time frequency two-dimensional unit composed of multiple OFDM symbols which are continuous on time and multiple subcarriers which are continuous on frequency. FIG. 4 is a schematic diagram of an RB whose time length is one time slot in the OFDM system. As shown in FIG. 4, an RB may occupy 12 subcarriers in a frequency domain. In the LTE and LTE-A system, a basic time granularity of resource allocation is an integral multiple of one subframe, and a frequency domain granularity is an integral multiple of one RB (namely 12 subcarriers). In an RB structure in FIG. 4, one time slot may include 7 continuous OFDM symbols, and one subcarrier may include two time slots, namely 14 continuous OFDM symbols. In addition, each small square in FIG. 4 represents one Resource Element (RE). In one time slot, there are 12*7=84 REs on each RB. When the length of each time slot is 0.5 ms, two continuous time slots form one subframe, so the length of each subframe is 1 ms. Because one TB at least occupies one subframe in the time domain, one TB may need to occupy multiple OFDM symbols in the time domain. If a factor that a control channel (e.g. a Physical Downlink Control Channel (PDCCH)) also occupies a part of the OFDM symbols is taken into consideration, then the number of the OFDM symbols actually occupied by one TB may be less than 14, but usually greater than 10.

FIG. 5 is a schematic diagram of a method for physical channel mapping in an LTE system. As shown in FIG. 5, in an OFDM system, information transmission is usually performed by taking one TB as a unit. One TB may include one or more code blocks. Each code block may be subjected to encoding and rate matching processing before one encoded code block can be generated. Each encoded code block may be formed into one symbol stream after modulation. That is, one TB may correspond to multiple symbol streams, for example, J1, J2, . . . , Jn. In the LTE and LTE-A system, one TB may occupy a maximum of 4 layers, and may occupy the same time frequency resource area on each layer. A transport layer is a concept of multi-antenna "layer" in the LTE and LTE-A system, indicating the number of effective independent channels in spatial multiplexing. The concept "layer" is another dimension except time and frequency.

In the LTE and LTE-A system, 9 different transmission modes are defined for data transmission, and different transmission modes respectively correspond to single-antenna transmission, antenna diversity, beamforming and spatial multiplexing. In different transmission modes, a transmitting terminal may adopt different transmission strategies and parameters. A Down Control Information (DCI) format is a command word related to the transmission mode. The DCI may include: signaling related to downlink scheduling allocation and uplink scheduling request, physical channel resource allocation information, transmission formats (like a code rate, and a modulation order), spatial multiplexing (like a precoding matrix and the number of spatial layers), information related to Hybrid Automatic Repeat Request (HARD) and information related to power control. The DCI may be transmitted in the PDCCH.

According to different functions, multiple types of Radio Network Temporary Identifiers (RNTIs) may be provided in the LTE system. Each User Equipment (UE) may correspond to multiple RNTIs at the same time. Functions like system broadcast and specific user scheduling may be implemented by using the RNTI to scramble a PDCCH control message.

Block encoding is an encoding technology between data packets, namely a process of generating a check data packet by encoding multiple source data packets. The block encoding is a process of generating a check sequence at a corresponding position of the check data packet based on an information sequence at the corresponding position of a source data packet. Each check data packet may include data at the corresponding position of each check sequence. There may be various methods for block encoding, for example, it may be feasible to generate the check data packet by performing an XOR operation to each source data packet, or by adopting a Reed-Solomon code, or by a Fountain code or network code. The block encoding may provide a better transmission performance by increasing an encoding constraint between the data packets.

Code block division is an essential process in a channel encoding chain processing flow. However, during an application process of the code block division, a time delay has not been fully considered. By taking a method for code block division in the 3GPP LTE system for example, the length of each code block after the code block division may be between 3000 bits to 6120 bits. When a bandwidth is relatively small, each code block may occupy multiple continuous OFDM symbols in the time domain, and the receiving terminal may decode a code block only after receiving all these OFDM symbols. If a system is sensitive to a time delay (e.g. Internet of Vehicles), decoding the data subjected to the code block division may cause a time delay that the system cannot accept. Therefore, for a system having a high requirement on the time delay, the code block division technology may influence normal operation of the system.

SUMMARY

The following is an overview of the subject matter elaborated in this application. The overview is not intended to limit the scope of protection of the claims.

Some embodiments of the disclosure provide a method and apparatus for code block division, which may ensure that code block decoding does not cause a system time delay while performing code block division.

An embodiment of the disclosure provides a method for code block division, which may include the following acts.

A reference information block length of a code block may be determined according to an obtained division related parameter.

A maximum information block length may be determined according to the reference information block length and a hardware parameter.

A TB having a length greater than the maximum information block length may be divided into two or more code blocks according to the obtained division related parameter, the hardware parameter and the determined maximum information block length.

An information length after code block division may be less than the determined maximum information block length.

In an exemplary embodiment, the division related parameter may include at least one of: a physical channel resource parameter and a spectral efficiency parameter.

In an exemplary embodiment, the spectral efficiency parameter may include any one or more of the following parameters: a modulation scheme M of a transmission signal, a coding rate R of a TB, and the number $N_{layer}$ of spatial layers occupied by a transmission signal.

The physical channel resource parameter may include: the maximum number $N_{cb}$ of OFDM symbols allowed to be occupied by each code block in a time domain and the number $N_{subcarrier}$ of frequency-domain subcarriers occupied by a transmission signal.

The act of determining the reference information block length may include the following act.

The reference information block length $K_R$ of the code block may be determined according to the physical channel resource parameter and the spectral efficiency parameter.

In an exemplary embodiment, the reference information block length $K_R$ of the code block may be obtained based on a following formula: $K_R = N_{cb} \cdot N_{subcarrier} \cdot M \cdot R \cdot N_{layer}$ In the embodiment, the number $N_{subcarrier}$ of frequency-domain subcarriers occupied by the transmission signal may be equal to a product of the number $N_{RB}$ of RBs occupied by the transmission signal and the number $N_{SP}$ of subcarriers included in each RB.

In an exemplary embodiment, the physical channel resource parameter may include: the number $N_{tb}$ of OFDM symbols occupied by the TB in a time domain and the maximum number $N_{cb}$ of OFDM symbols allowed to be occupied by each code block in the time domain. The division related parameter may further include a size B of the TB and a length L of a CRC of each code block.

The act of determining the reference information block length $K_R$ of the code block may include the following act.

The reference information block length $K_R$ of the code block may be determined according to the size B of the TB, the length L of the CRC of each code block and the physical channel resource parameter.

In an exemplary embodiment, the reference information block length $K_R$ of the code block may be obtained based on a following formula:

$$K_R = B \cdot \frac{N_{cb}}{N_{tb}} + L.$$

In an exemplary embodiment, the division related parameter may further include a hardware parameter. The hardware parameter may be a UE Category parameter which is able to indicate a buffer size of a terminal.

The physical channel resource parameter may include: the number $N_{tb}$ of OFDM symbols occupied by the TB in a time domain and the maximum number $N_{cb}$ of OFDM symbols allowed to be occupied by each code block in the time domain.

The act of determining the reference information block length $K_R$ of the code block may include the following acts.

The maximum number $N_{Softbits}$ of soft bits which are able to be occupied by the TB may be obtained according to the UE Category parameter which is able to indicate the buffer size of the terminal.

According to the number $N_{tb}$ of OFDM symbols occupied by the TB in a time domain and the maximum number $N_{cb}$ of OFDM symbols allowed to be occupied by each code block in the time domain, the minimum number $CB_{num}$ of code blocks included in the TB may be obtained based on a following formula:

$$CB_{Num} = \lceil N_{tb}/N_{cb} \rceil.$$

The reference information block length $K_R$ may be obtained based on a following formula:

$$K_R = \left\lceil \frac{N_{Softbits}}{CB_{Num}} \cdot R \right\rceil.$$

In the embodiment, $\lceil X \rceil$ means rounding up X to an integer.

In an exemplary embodiment, the hardware parameter may include at least one of: a maximum information block length $K_{encoder}$ supported by an encoder, and a set $\{K\}_{interleaver}$ of information block lengths supported by the encoder.

When an encoding method of the TB is a convolutional code, the maximum information block length $K_{max}$ may be determined based on a following formula:

$$K_{max} = \min(K_R, K_{encoder})$$

When the encoding method of the TB is a Turbo code, the act of determining the maximum information block length $K_{max}$ may include the following acts.

When the reference information block length $K_R$ is less than the maximum information block length $K_{encoder}$ supported by the encoder, an information block length which is greater than or equal to the reference information block length $K_R$ of the code block and is closest to the reference information block length $K_R$ may be selected from the set $\{K\}_{interleaver}$ of information block lengths supported by the encoder as the maximum information block length $K_{max}$ of the code block.

When the reference information block length $K_R$ is greater than or equal to the maximum information block length $K_{encoder}$ supported by the encoder, the maximum information block length $K_{encoder}$ supported by the encoder may be selected as the maximum information block length $K_{max}$ of the code block.

In the embodiment, the function min ( ) means selecting a minimum value.

In an exemplary embodiment, when the encoding method of the TB is the Turbo code, the maximum information block length $K_{max}$ may be determined based on a following formula:

$$K_{max} = \begin{cases} \underset{\hat{K} \geq K_R, \hat{K} \in \{K_{interleaver}\}}{\text{argmin}} (\hat{K} - K_R), & K_R < K_{encoder} \\ K_{encoder}, & K_R \geq K_{encoder} \end{cases},$$

where argmin (F(X)) means minimizing F(X).

In an exemplary embodiment, at least one of the division related parameter and the hardware parameter may be obtained through any one or more of the following modes: transmission mode indication, DCI format and RNTI.

In an exemplary embodiment, the method may further include the following act.

The maximum information block length $K_{max}$ may be obtained through direct indication given via the transmission mode indication, or the DCI format, or the RNTI.

In an exemplary embodiment, the division related parameter may further include a size B of the TB and a length L of the CRC of each code block.

The hardware parameter may include: a set $\{K\}_{interleaver}$ of information block lengths supported by an encoder.

The code block division may include the following acts.

The number C of divided code blocks may be determined according to the size B of the TB, the length L of the CRC of each code block and the maximum information block length $K_{max}$.

An information block length of each code block may be determined according to the set $\{K\}_{interleaver}$ of information block lengths supported by the encoder, the number C of code blocks, the size B of the TB and the length L of the CRC of each code block.

The code block division may be performed according to the determined information block length of each code block.

In an exemplary embodiment, the number C of divided code blocks may be determined based on a following formula:

$$C = \left\lceil \frac{B}{K_{max} - L} \right\rceil;$$

where $\lceil x \rceil$ means rounding up X to an integer.

In an exemplary embodiment, that the information block length of each code block is determined may include the following acts.

When the size B of the TB is able to be divided evenly by ($K_{max}$−L) or the number C of code blocks, the information block length of each code block may be B/C.

When the size B of the TB is not able to be divided evenly by ($K_{max}$−L) or the number C of code blocks, the C code blocks may be divided into first type of code blocks and second type of code blocks with different code block information block lengths.

A code block information block length $K_I$ of the first type of code blocks may be a minimum K value, satisfying that a product of the number C of code blocks and the code block information block length $K_I$ of the first type of code blocks is greater than or equal to the size B of the TB, in the set $\{K\}_{interleaver}$ of information block lengths supported by the encoder.

A code block information block length $K_{II}$ of the second type of code blocks may be a maximum K value, satisfying that the code block information block length $K_{II}$ of the second type of code blocks is less than the code block information block length $K_I$ of the first type of code blocks, in the set $\{K\}_{interleaver}$ of information block lengths supported by the encoder.

In an exemplary embodiment, the code block information block length $K_I$ of the first type of code blocks may be:

$$K_I = \underset{K \geq \lceil \frac{B}{C} \rceil, K \in \{K\}_{interleaver}}{\text{argmin}} \left(K - \left\lceil \frac{B}{C} \right\rceil\right);$$

the code block information block length $K_{II}$ of the second type of code blocks may be:

$$K_{II} = \underset{K_I, K_{II} \in \{K\}_{interleaver}, K_{II} < K_I}{\mathrm{argmin}} (K_I - K_{II});$$

the number $C_I$ of the first type of code blocks and the number $C_{II}$ of the second type of code blocks may satisfy:

$$C_{II} = \left\lfloor \frac{C \cdot K_I - (B + C \cdot L)}{K_I - K_{II}} \right\rfloor,$$

where $C_I = C - C_{II}$, $\lfloor x \rfloor$ means rounding down x to an integer.

In an exemplary embodiment, the method may further include the following act. After the code block division is completed, the former $C_{II}$ code blocks may be set as the second type of code blocks, and the latter $C_I$ code blocks may be set as the first type of code blocks.

In an exemplary embodiment, the method may further include the following act.

CRC adding, channel encoding and rate matching may be respectively performed on each divided code block to obtain a corresponding encoded code block, and code block cascading may be performed to obtained encoded code blocks.

In an exemplary embodiment, the method may further include the following act.

Block encoding may be performed to two or more divided code blocks to generate a check data block.

In an exemplary embodiment, the method may further include the following act.

A part of bits at any position of each encoded code block and a part of bits at any position of each check data block generated by performing block encoding may be deleted.

A size of the part of bits may be computed through the following acts.

A sum of numbers of bits of all encoded code blocks and all check data blocks generated by performing the block encoding, and a sum of numbers of bits of all the encoded code blocks before the block encoding may be computed.

The sum of the numbers of bits of all the encoded code blocks before the block encoding may be subtracted from the sum of the numbers of bits of all the encoded code blocks and all the check data blocks generated by performing the block encoding to obtain a bit number difference value.

The number of encoded code blocks may be added to the number of check data blocks generated by performing the block encoding to obtain a sum of information blocks.

A quotient obtained by dividing the obtained bit number difference value by the sum of obtained information blocks may be used as the size of the part of bits.

In an exemplary embodiment, the method may further include the following act.

The code block cascading may be performed to the encoded code blocks from which the part of bits has been deleted and the check data blocks generated by performing the block encoding from which the part of bits has been deleted.

The code block cascading may include: connecting in series bits of the encoded code blocks from which the part of bits has been deleted and bits of the check data blocks generated by performing the block encoding from which the part of bits has been deleted, and putting the check data blocks generated by performing the block encoding from which the part of bits has been deleted behind the encoded code blocks from which the part of bits has been deleted.

Another embodiment of the disclosure provides an apparatus for code block division, which may include: a reference unit, a determining unit and a dividing unit.

The reference unit may be configured to determine the reference information block length of the code block according to the obtained division related parameter.

The determining unit may be configured to determine a maximum information block length according to the reference information block length and the hardware parameter.

The dividing unit may be configured to divide the TB having a length greater than the maximum information block length into two or more code blocks according to the obtained division related parameter, the hardware parameter and the determined maximum information block length.

In the embodiment, an information length after code block division may be less than the determined maximum information block length.

In an exemplary embodiment, the reference unit may be configured to, determine the reference information block length of the code block according to at least one of obtained physical channel resource parameter and spectral efficiency parameter.

In an exemplary embodiment, the reference unit may be configured to, determine the reference information block length $K_R$ of the code block according to the obtained spectral efficiency parameter and the obtained physical channel resource parameter. The spectral efficiency parameter may include any one or more of the following parameters: the modulation scheme M of the transmission signal, the coding rate R of the TB, and the number $N_{layer}$ of spatial layers occupied by a transmission signal. The physical channel resource parameter may include: the maximum number $N_{cb}$ of OFDM symbols allowed to be occupied by each code block in the time domain and the number $N_{subcarrier}$ of frequency-domain subcarriers occupied by a transmission signal.

In an exemplary embodiment, the reference unit may be configured to, according to at least one of the obtained physical channel resource parameter and spectral efficiency parameter, obtain the reference information block length $K_R$ of the code block based on a following formula $K_R = N_{cb} \cdot N_{subcarrier} \cdot M \cdot R \cdot N_{layer}$.

In an exemplary embodiment, the reference unit is further configured to, obtain a size B of the TB and a length L of the CRC of each code block, and determine the reference information block length $K_R$ of the code block according to the obtained physical channel resource parameter which may include the number $N_{tb}$ of OFDM symbols occupied by the TB in a time domain and the maximum number $N_{cb}$ of OFDM symbols allowed to be occupied by each code block in the time domain.

In an exemplary embodiment, the reference unit may be further configured to, obtain a size B of the TB and a length L of the CRC of each code block, and determine, based on a following formula $$K_R = B \cdot \frac{N_{cb}}{N_{tb}} + L,$$

the reference information block length $K_R$ of the code block according to the obtained physical channel resource parameter.

In an exemplary embodiment, the reference unit may be further configured to, obtain the hardware parameter at least including the UE Category parameter which is able to indicate the buffer size of the terminal, obtain, according to the UE Category parameter which is able to indicate the buffer size of the terminal, the maximum number $N_{Softbits}$ of soft bits which are able to be occupied by the TB, obtain the minimum number $CB_{num}$ of code blocks included in the TB $CB_{Num}=\lceil N_{tb}/N_{cb} \rceil$ according to the obtained physical channel resource parameter which may include the number $N_{tb}$ of OFDM symbols occupied by the TB in a time domain and the maximum number $N_{cb}$ of OFDM symbols allowed to be occupied by each code block in the time domain, and obtain the reference information block length $K_R$ based on a following formula:

$$K_R = \left\lceil \frac{N_{Softbits}}{CB_{Num}} \cdot R \right\rceil.$$

In an exemplary embodiment, the hardware parameter may include at least one of: a maximum information block length $K_{encoder}$ supported by the encoder, and a set $\{K\}_{interleaver}$ of information block lengths supported by an encoder.

The determining unit may be configured to determine the maximum information block length according to the reference information block length and the hardware parameter in a following manner.

When an encoding method of the TB is the convolutional code, the maximum information block length $K_{max}$ may be determined based on a following formula:

$$K_{max}=\min(K_R, K_{encoder}).$$

When the encoding method of the TB is the Turbo code, the maximum information block length $K_{max}$ may be determined in the following manner.

When the reference information block length $K_R$ is less than the maximum information block length $K_{encoder}$ supported by the encoder, an information block length which is greater than or equal to the reference information block length $K_R$ of the code block and is closest to the reference information block length $K_R$ may be selected from the set $\{K\}_{interleaver}$ of information block lengths supported by the encoder as the maximum information block length $K_{max}$ of the code block.

When the reference information block length $K_R$ is greater than or equal to the maximum information block length $K_{encoder}$ supported by the encoder, the maximum information block length $K_{encoder}$ supported by the encoder may be selected as the maximum information block length $K_{max}$ of the code block.

In the embodiment, the function min ( ) means selecting a minimum value.

In an exemplary embodiment, the hardware parameter may include at least one of: a maximum information block length $K_{encoder}$ supported by the encoder, and a set $\{K\}_{interleaver}$ of information block lengths supported by an encoder.

The determining unit may be configured to determine the maximum information block length according to the reference information block length and the hardware parameter in a following manner.

When an encoding method of the TB is the convolutional code, the maximum information block length $K_{max}$ may be determined based on a following formula:

$$K_{max}=\min(K_R, K_{encoder})$$

When the encoding method of the TB is the Turbo code, the maximum information block length $K_{max}$ may be determined based on a following formula:

$$K_{max} = \begin{cases} \underset{\hat{K} \geq K_R, \hat{K} \in \{K_{interleaver}\}}{\operatorname{argmin}} (\hat{K} - K_R), & K_R < K_{encoder} \\ K_{encoder}, & K_R \geq K_{encoder} \end{cases}.$$

In an exemplary embodiment, the apparatus may further include an obtaining unit. The obtaining unit may be configured to obtain at least one of the division related parameter and the hardware parameter through one or more of the transmission mode indication, the DCI format and the RNTI.

In an exemplary embodiment, the apparatus may further include an indicating unit. The indicating unit may be configured to obtain the maximum information block length $K_{max}$ through any one or more of the transmission mode indication, the DCI format and the RNTI.

In an exemplary embodiment, the division related parameter may further include a size B of the TB and a length L of the CRC of each code block.

The hardware parameter may at least include: a set $\{K\}_{interleaver}$ of information block lengths supported by an encoder.

The dividing unit may be configured to, determine the number C of divided code blocks according to the size B of the TB, the length L of the CRC of each code block and the maximum information block length $K_{max}$;

determine an information block length of each code block according to the set $\{K\}_{interleaver}$ of information block lengths supported by the encoder, the number C of code blocks, the size B of the TB and the length L of the CRC of each code block; and perform the code block division according to the determined information block length of each code block.

In an exemplary embodiment, the dividing unit may be configured to, determine the number C of divided code blocks based on a following formula $$C = \left\lceil \frac{B}{K_{max} - L} \right\rceil,$$

where $\lceil x \rceil$ means rounding up X to an integer, determine an information block length of each code block according to the set $\{K\}_{interleaver}$ of information block lengths supported by the encoder, the number C of code blocks, the size B of the TB and the length L of the CRC of each code block, and perform the code block division according to the determined information block length of each code block.

In an exemplary embodiment, the dividing unit may be configured to, determine the number C of divided code blocks according to the size B of the TB, the length L of the CRC of each code block and the maximum information block length $K_{max}$.

When the size B of the TB is able to be divided evenly by $(K_{max}-L)$ or the number C of code blocks, the information block length of each code block may be B/C.

When the size B of the TB is not able to be divided evenly by $(K_{max}-L)$ or the number C of code blocks, the C code blocks may be divided into first type of code blocks and second type of code blocks with different code block information block lengths.

A code block information block length $K_I$ of the first type of code blocks may be a minimum K value, satisfying that a product of the number C of code blocks and the code block information block length $K_I$ of the first type of code blocks is greater than or equal to the size B of the TB, in the set $\{K\}_{interleaver}$ of information block lengths supported by the encoder.

A code block information block length $K_{II}$ of the second type of code blocks may be a maximum K value, satisfying that the code block information block length $K_{II}$ of the second type of code blocks is less than the code block information block length $K_I$ of the first type of code blocks, in the set $\{K\}_{interleaver}$ of information block lengths supported by the encoder.

The dividing unit may be configured to perform the code block division according to the determined information block length of each code block.

In an exemplary embodiment, the dividing unit may be configured to, determine the number C of divided code blocks according to the size B of the TB, the length L of the CRC of each code block and the maximum information block length $K_{max}$.

When the size B of the TB is able to be divided evenly by $(K_{max}-L)$ or the number C of code blocks, the information block length of each code block may be B/C.

When the size B of the TB is not able to be divided evenly by $(K_{max}-L)$ or the number C of code blocks, the C code blocks may be divided into first type of code blocks and second type of code blocks with different code block information block lengths.

The dividing unit may be configured to compute the code block information block length $K_I$ of the first type of code blocks based on a following formula:

$$K_I = \underset{K \geq \lceil \frac{B}{C} \rceil, K \in \{K\}_{interleaver}}{\operatorname{argmin}} \left(K - \lceil \frac{B}{C} \rceil\right),$$

and compute the code block information block length $K_{II}$ of the second type of code blocks based on a following formula:

$$K_{II} = \underset{K_I, K_{II} \in \{K\}_{interleaver}, K_{II} < K_I}{\operatorname{argmin}} (K_I - K_{II}).$$

The number $C_I$ of the first type of code blocks and the number $C_{II}$ of the second type of code blocks may satisfy:

$$C_{II} = \left\lfloor \frac{C \cdot K_I - (B + C \cdot L)}{K_I - K_{II}} \right\rfloor,$$

where $C_I = C - C_{II}$.

The dividing unit may be configured to perform the code block division according to the determined information block length of each code block.

In an exemplary embodiment, the apparatus may further include a setting unit. The setting unit may be configured to, after the dividing unit completes the code block division, set the former $C_{II}$ code blocks as the second type of code blocks, and set the latter $C_I$ code blocks as the first type of code blocks.

In an exemplary embodiment, the apparatus may further include a cascading unit. The cascading unit may be configured to respectively perform CRC adding, channel encoding and rate matching on each divided code block to obtain a corresponding encoded code block, and perform code block cascading to obtained encoded code blocks.

In an exemplary embodiment, the apparatus may further include a checking unit. The checking unit may be configured to perform the block encoding to two or more than two divided code blocks to generate the check data block.

In an exemplary embodiment, the apparatus may further include a deleting unit.

The deleting unit may be configured to delete a part of bits at any position of each encoded code block and a part of bits at any position of each check data block generated by performing the block encoding.

In the embodiment, a size of the part of bits may be computed through the following acts.

A sum of numbers of bits of all encoded code blocks and all check data blocks generated by performing the block encoding, and a sum of numbers of bits of all the encoded code blocks before the block encoding may be computed.

The sum of the numbers of bits of all the encoded code blocks before the block encoding may be subtracted from the sum of the numbers of bits of all the encoded code blocks and all the check data blocks generated by performing the block encoding to obtain the bit number difference value.

The number of encoded code blocks may be added to the number of check data blocks generated by performing the block encoding to obtain a sum of information blocks.

The quotient obtained by dividing the obtained bit number difference value by the sum of obtained information blocks may be used as the size of the part of bits.

In an exemplary embodiment, the apparatus may further include a check cascading unit. The check cascading unit may be configured to perform the code block cascading on the encoded code blocks from which the part of bits has been deleted and the check data blocks generated by performing the block encoding from which the part of bits has been deleted.

The code block cascading may include: connecting in series bits of the encoded code blocks from which the part of bits has been deleted and bits of the check data blocks generated by performing the block encoding from which the part of bits has been deleted, and putting the check data blocks generated by performing the block encoding from which the part of bits has been deleted behind the encoded code blocks from which the part of bits has been deleted.

Compared with a related technology, the reference information block length of the code block may be determined according to the division related parameter; the maximum information block length may be determined according to the reference information block length and the hardware parameter; and the TB having a length greater than the maximum information block length may be divided into two or more code blocks according to the obtained division related parameter, the hardware parameter and the determined maximum information block length. The information length after code block division is less than the determined maximum information block length. By determining the reference information block length of the code block according to the division related parameter, and performing the code block division of the TB so that each code block is less than the determined maximum information block length, the method of some embodiments of the disclosure may reduce the delay brought by the code block division to a system, avoid influences on the work of the system due to the delay caused by the code block division, and improve system performance.

Other aspects may be understood after the accompanying drawings and detailed descriptions are read and understood.

DETAILED DESCRIPTION OF THE EMBODIMENTS

Figure 1:
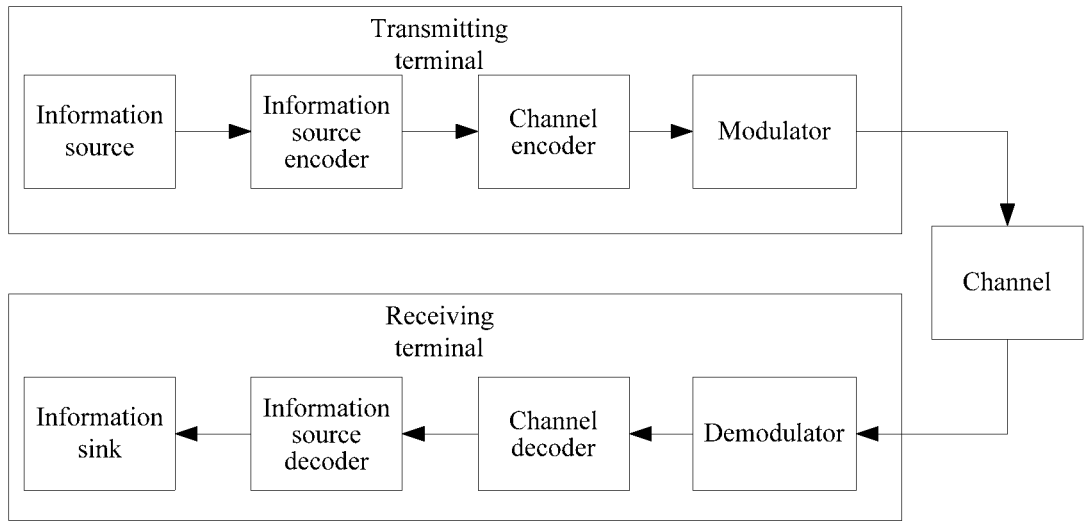
FIG. 1 is a structure diagram of a digital communication system.
Figure 2:
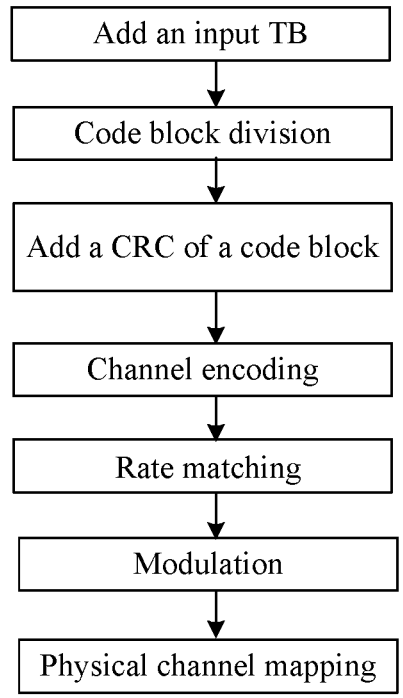
FIG. 2 is a flowchart of processing of channel encoding chain.
Figure 3:
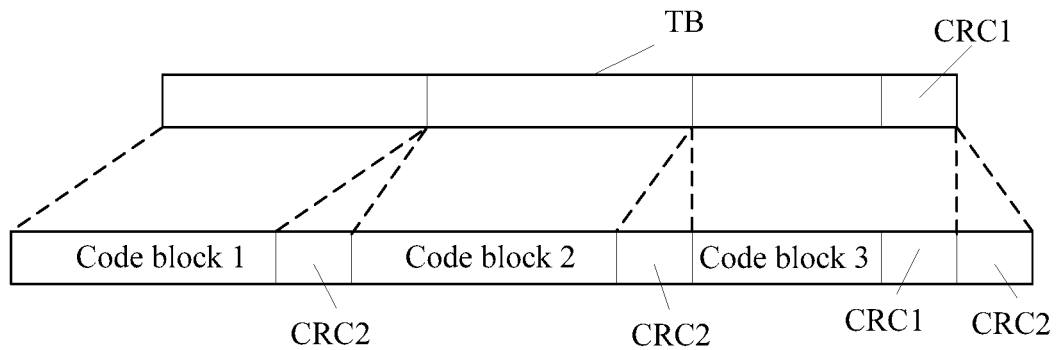
FIG. 3 is a schematic diagram of code block division.
Figure 4:
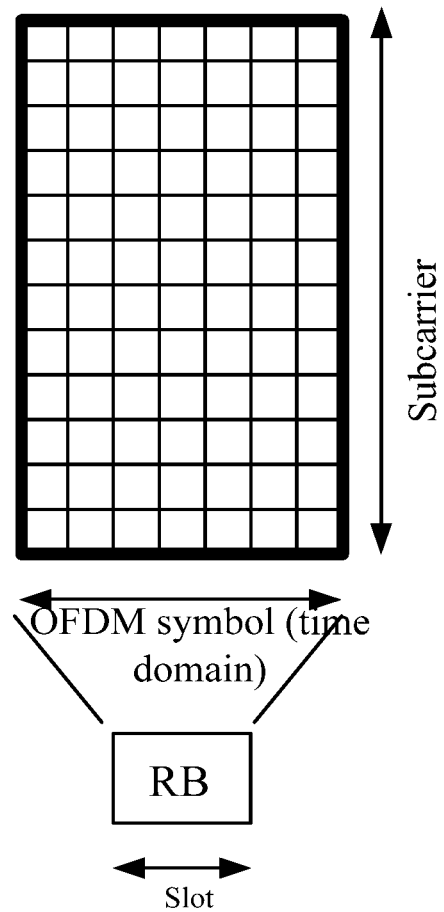
FIG. 4 is a schematic diagram of an RB whose time length is one time slot in the OFDM system.
Figure 5:
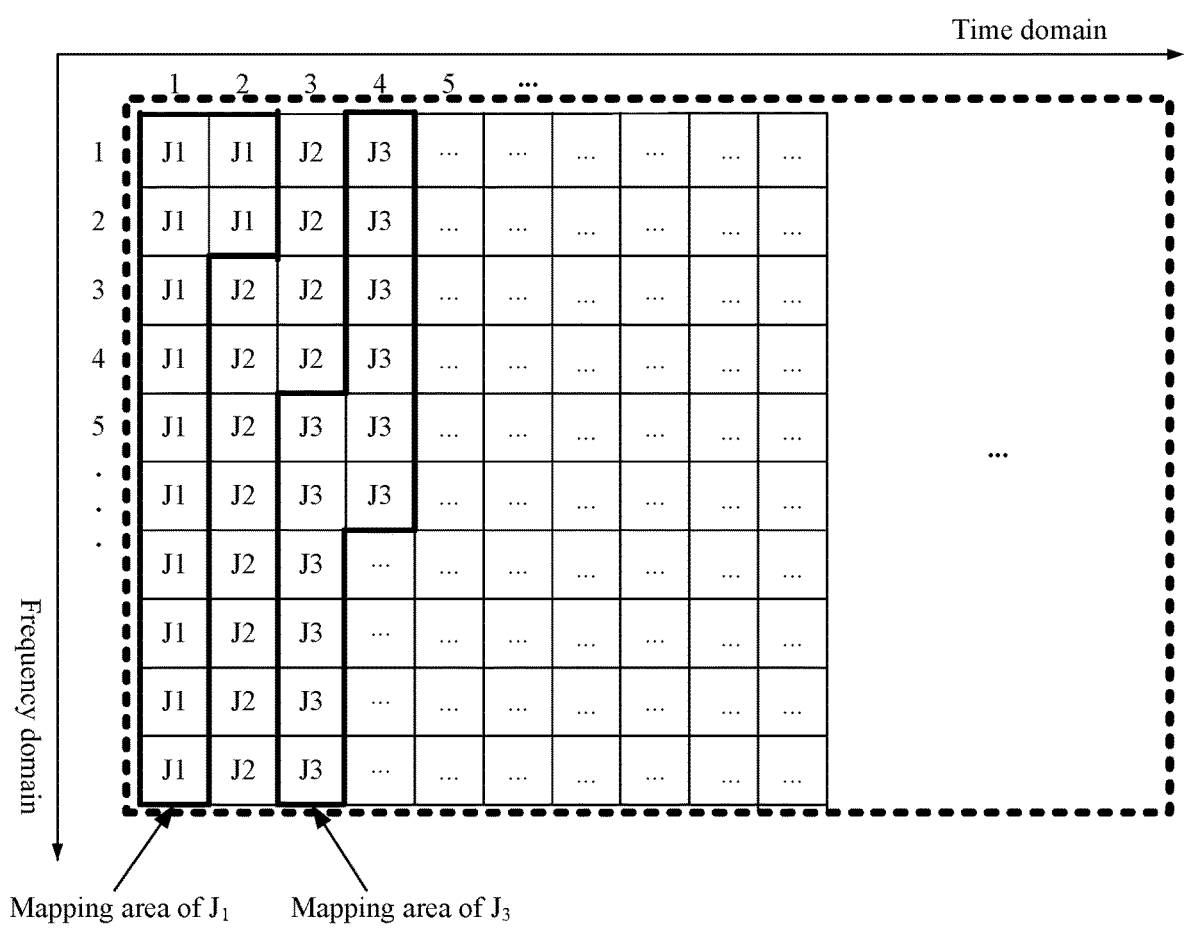
FIG. 5 is a schematic diagram of a method for physical channel mapping in an LTE system.
Figure 6:
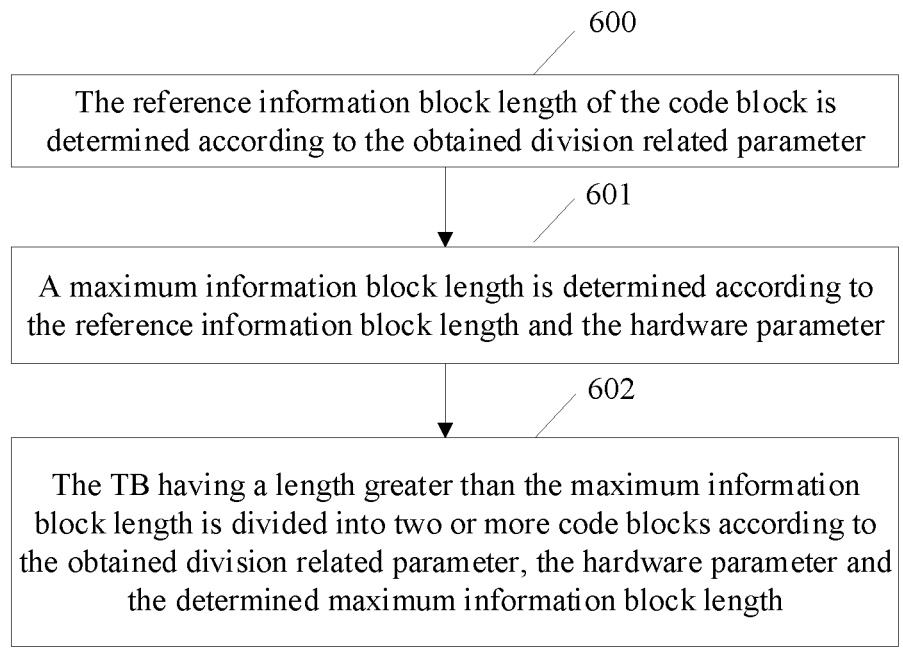
FIG. 6 is a flowchart of a method for code block division according to an embodiment of the disclosure.

FIG. 6 is a flowchart of a method for code block division according to an embodiment of the disclosure. As shown in FIG. 6, the method may include the following acts.

At act S600, the reference information block length of the code block may be determined according to the obtained division related parameter.

At this act, the division related parameter may include: the physical channel resource parameter, and/or the spectral efficiency parameter.

At this act, the reference information block length may be determined by, for example, the following several manners.

Manner 1:

The spectral efficiency parameter may at least include any one or more of the following parameters: the modulation scheme M of the transmission signal, the coding rate R of the TB, and the number $N_{layer}$ of spatial layers occupied by a transmission signal.

The physical channel resource parameter may include: the maximum number $N_{cb}$ of OFDM symbols allowed to be occupied by each code block in the time domain and the number $N_{subcarrier}$ of frequency-domain subcarriers occupied by a transmission signal.

The act of determining the reference information block length may include the following act.

The reference information block length $K_R$ of the code block may be determined according to the physical channel resource parameter and the spectral efficiency parameter.

In an exemplary embodiment, the reference information block length $K_R$ of the code block may be obtained based on a following formula: $K_R = N_{cb} \cdot N_{subcarrier} \cdot M \cdot R \cdot N_{layer}$.

In the embodiment, the number $N_{subcarrier}$ of frequency-domain subcarriers occupied by the transmission signal may be equal to a product of the number $N_{RB}$ of RBs occupied by the transmission signal and the number $N_{SP}$ of subcarriers included in each RB. That is, the reference information block length $K_R$ of the code block may be obtained based on a following formula: $K_R = N_{cb} \cdot N_{subcarrier} \cdot M \cdot R \cdot N_{layer}$.

Note that, the value of $N_{SP}$ is e.g., 12 in the LTE and LTE-A system.

Manner 2:

The physical channel resource parameter may at least include: the number $N_{tb}$ of OFDM symbols occupied by the TB in a time domain and the maximum number $N_{cb}$ of OFDM symbols allowed to be occupied by each code block in the time domain. The division related parameter may further include a size B of the TB and a length L of a CRC of each code block.

The act of determining the reference information block length $K_R$ of the code block may include the following act. The reference information block length $K_R$ of the code block may be determined according to the size B of the TB, the length L of the CRC of each code block and the physical channel resource parameter.

In an exemplary embodiment, the reference information block length $K_R$ of the code block may be obtained based on a following formula:

$$K_R = B \cdot \frac{N_{cb}}{N_{tb}} + L.$$

Manner 3:

The division related parameter may further include a hardware parameter. The hardware parameter may include the UE Category parameter which is able to indicate the buffer size of the terminal.

The physical channel resource parameter may at least include: the number $N_{tb}$ of OFDM symbols occupied by the TB in a time domain and the maximum number $N_{cb}$ of OFDM symbols allowed to be occupied by each code block in the time domain.

The act of determining the reference information block length $K_R$ of the code block may include the following acts.

The maximum number $N_{Softbits}$ of soft bits which are able to be occupied by the TB may be obtained according to the UE Category parameter which is able to indicate the buffer size of the terminal.

According to the number $N_{tb}$ of OFDM symbols occupied by the TB in a time domain and the maximum number $N_{cb}$ of OFDM symbols allowed to be occupied by each code block in the time domain, the minimum number $CB_{num}$ of code blocks included in the TB may be obtained based on a following formula: $CB_{Num} = \lceil N_{tb}/N_{cb} \rceil$.

The reference information block length $K_R$ may be obtained based on a following formula:

$$K_R = \left\lceil \frac{N_{Softbits}}{CP_{Num}} \cdot R \right\rceil.$$

At this act, at least one of the division related parameter and the hardware parameter may be obtained through any one or more of the following modes: the transmission mode indication, the DCI format and the RNTI.

At act S601, the maximum information block length may be determined according to the reference information block length and the hardware parameter.

At this act, the hardware parameter may include at least one of: a maximum information block length $K_{encoder}$ supported by the encoder, and a set $\{K\}_{interleaver}$ of information block lengths supported by an encoder.

When an encoding method of the TB is the convolutional code, the maximum information block length $K_{max}$ may be determined based on a following formula:

$$K_{max} = \min(K_R, K_{encoder}).$$

When the encoding method of the TB is the Turbo code, the act of determining the maximum information block length $K_{max}$ may include the following acts.

When the reference information block length $K_R$ is less than the maximum information block length $K_{encoder}$ supported by the encoder, an information block length which is greater than or equal to the reference information block length $K_R$ of the code block and is closest to the reference information block length $K_R$ may be selected from the set $\{K\}_{interleaver}$ of information block lengths supported by the encoder may be selected as the maximum information block length $K_{max}$ of the code block.

When the reference information block length $K_R$ is greater than or equal to the maximum information block length $K_{encoder}$ supported by the encoder, the maximum information block length $K_{encoder}$ supported by the encoder may be selected as the maximum information block length $K_{max}$ of the code block.

Herein the function min ( ) means selecting a minimum value.

In an exemplary embodiment, when the encoding method of the TB is the Turbo code, the maximum information block length $K_{max}$ may be determined based on a following formula:

$$K_{max} = \begin{cases} \underset{\hat{K} \geq K_R, \hat{K} \in \{K_{interleaver}\}}{\operatorname{argmin}} (\hat{K} - K_R), & K_R < K_{encoder} \\ K_{encoder}, & K_R \geq K_{encoder} \end{cases}.$$

The method of the disclosure may further include the following act.

The maximum information block length $K_{max}$ may be obtained through direct indication given via the transmission mode indication, or the DCI format, or the RNTI.

Note that, the maximum information block length $K_{max}$ obtained through direct indication may be the maximum information block length $K_{max}$ set according to a value required by the system, e.g. a time delay requirement of the system. The system performance may be ensured by directly indicating the maximum information block length $K_{max}$.

At act S602, the TB having a length greater than the maximum information block length may be divided into two or more code blocks according to the division related parameter, the hardware parameter and the determined maximum information block length.

At this act, the division related parameter may further include a size B of the TB and a length L of the CRC of each code block.

The hardware parameter may at least include: a set $\{K\}_{interleaver}$ of information block lengths supported by an encoder.

The code block division may include the following acts.

The number C of divided code blocks may be determined according to the size B of the TB, the length L of the CRC of each code block and the maximum information block length $K_{max}$.

An information block length of each code block may be determined according to the set $\{K\}_{interleaver}$ of information block lengths supported by the encoder, the number C of code blocks, the size B of the TB and the length L of the CRC of each code block.

The code block division may be performed according to the determined information block length of each code block.

In an exemplary embodiment, the number C of divided code blocks may be determined based on a following formula:

$$C = \left\lceil \frac{B}{K_{max} - L} \right\rceil;$$

where $\lceil x \rceil$ means rounding up X to an integer.

The act of determining the information block length of each code block may include the following acts.

When the size B of the TB is able to be divided evenly by $(K_{max}-L)$ or the number C of code blocks, the information block length of each code block may be B/C.

When the size B of the TB is not able to be divided evenly by $(K_{max}-L)$ or the number C of code blocks, the C code blocks may be divided into first type of code blocks and second type of code blocks with different code block information block lengths.

A code block information block length $K_I$ of the first type of code blocks may be a minimum K value, satisfying that a product of the number C of code blocks and the code block information block length $K_I$ of the first type of code blocks is greater than or equal to the size B of the TB, in the set $\{K\}_{interleaver}$ of information block lengths supported by the encoder.

A code block information block length $K_{II}$ of the second type of code blocks may be a maximum K value, satisfying that the code block information block length $K_{II}$ of the second type of code blocks is less than the code block information block length $K_I$ of the first type of code blocks, in the set $\{K\}_{interleaver}$ of information block lengths supported by the encoder.

In an exemplary embodiment, the code block information block length Ku of the first type of code blocks may be:

$$K_I = \underset{K \geq \lceil \frac{B}{C} \rceil, K \in \{K\}_{interleaver}}{\operatorname{argmin}} \left(K - \left\lceil \frac{B}{C} \right\rceil\right).$$

The code block information block length $K_{II}$ of the second type of code blocks may be:

$$K_{II} = \underset{K_I, K_{II} \in \{K\}_{interleaver}, K_{II} < K_I}{\operatorname{argmin}} (K_I - K_{II}).$$

The number $C_I$ of the first type of code blocks and the number $C_{II}$ of the second type of code blocks may satisfy:

$$C_{II} = \left\lfloor \frac{C \cdot K_I - (B + C \cdot L)}{K_I - K_{II}} \right\rfloor,$$

where $C_I$-$C_{II}$; argmin (F(X)) means minimizing F(X); and $\lfloor x \rfloor$ means rounding down x to an integer.

The method of the disclosure may further include the following act. After the code block division is completed, the former $C_{II}$ code blocks may be set as the second type of code blocks, and the latter $C_I$ code blocks may be set as the first type of code blocks.

The method of the disclosure may further include the following act.

CRC adding, channel encoding and rate matching may be respectively performed on each divided code block to obtain a corresponding encoded code block, and code block cascading may be performed to obtained encoded code blocks.

The method of the disclosure may further include the following act.

The block encoding may be performed to two or more divided code blocks to generate the check data block.

The method of the disclosure may further include the following act.

A part of bits at any position of each encoded code block and a part of bits at any position of each check data block generated by performing block encoding may be deleted.

A size of the part of bits may be computed through the following acts.

A sum of numbers of bits of all encoded code blocks and all check data blocks generated by performing the block encoding, and a sum of numbers of bits of all the encoded code blocks before the block encoding may be computed.

The sum of the numbers of bits of all the encoded code blocks before the block encoding may be subtracted from the sum of the numbers of bits of all the encoded code blocks and all the check data blocks generated by performing the block encoding to obtain a bit number difference value.

The number of encoded code blocks may be added to the number of check data blocks generated by performing the block encoding to obtain a sum of information blocks.

The quotient obtained by dividing the obtained bit number difference value by the sum of obtained information blocks may be used as the size of the part of bits.

Note that, the part of bits deleted may be the check data of the encoded code block and the check data block, usually being at the tail of the encoded code block and the check data block.

The method of the disclosure may further include the following act.

The code block cascading may be performed to the encoded code blocks from which the part of bits has been deleted and the check data blocks generated by performing the block encoding from which the part of bits has been deleted.

The code block cascading may include: connecting in series bits of the encoded code blocks from which the part of bits has been deleted and bits of the check data blocks generated by performing the block encoding from which the part of bits has been deleted, and putting the check data blocks generated by performing the block encoding from which the part of bits has been deleted behind the encoded code blocks from which the part of bits has been deleted.

By determining the reference information block length of the code block according to the obtained division related parameter, and performing the code block division of the TB so that each code block is less than the determined maximum information block length, the method of some embodiments of the disclosure may reduce the delay brought by the code block division to a system, avoid influences on the work of the system due to the delay caused by the code block division, and improve system performance.

Figure 7:
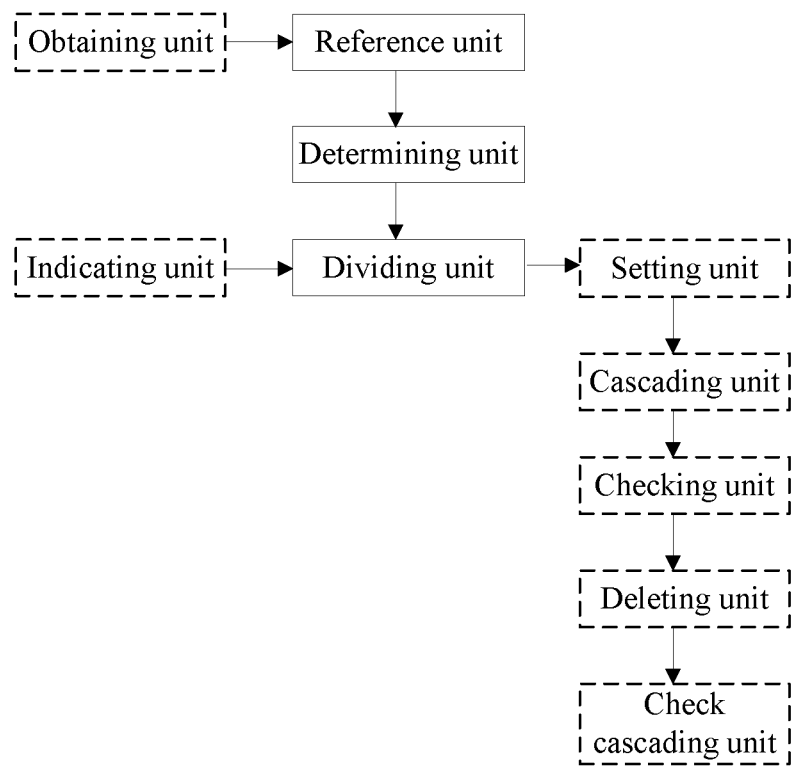
FIG. 7 is a structure diagram of an apparatus for code block division according to an embodiment of the disclosure.

FIG. 7 is a structure diagram of an apparatus for code block division according to an embodiment of the disclosure. As shown in FIG. 7, the apparatus may include: a reference unit, a determining unit and a dividing unit.

The reference unit may be configured to determine the reference information block length of the code block according to the obtained division related parameter.

The reference unit may be configured to determine the reference information block length of the code block according to at least one of obtained physical channel resource parameter and spectral efficiency parameter.

The reference unit may be configured to determine the reference information block length $K_R$ of the code block according to the obtained spectral efficiency parameter and the obtained physical channel resource parameter. The spectral efficiency parameter may include any one or more of the following parameters: the modulation scheme M of the transmission signal, the coding rate R of the TB, and the number $N_{layer}$ of spatial layers occupied by a transmission signal. The physical channel resource parameter may include: the maximum number $N_{cb}$ of OFDM symbols allowed to be occupied by each code block in the time domain and the number $N_{subcarrier}$ of frequency-domain subcarriers occupied by a transmission signal.

The reference unit may be configured to, according to at least one of the obtained physical channel resource parameter and spectral efficiency parameter, obtain the reference information block length $K_R$ of the code block based on a following formula $$K_R = N_{cb} \cdot N_{subcarrier} \cdot M \cdot R \cdot N_{layer}.$$

The reference unit may be further configured to, obtain a size B of the TB and a length L of the CRC of each code block, and determine the reference information block length $K_R$ of the code block according to the obtained physical channel resource parameter which may include the number $N_{tb}$ of OFDM symbols occupied by the TB in a time domain and the maximum number $N_{cb}$ of OFDM symbols allowed to be occupied by each code block in the time domain.

The reference unit may be further configured to obtain the size B of the TB and the length L of the CRC of each code block, and determine, based on a following formula $$K_R = B \cdot \frac{N_{cb}}{N_{tb}} + L,$$

the reference information block length $K_R$ of the code block according to the obtained physical channel resource parameter.

The reference unit may be further configured to, obtain the hardware parameter at least including the UE Category parameter which is able to indicate the buffer size of the terminal, obtain, according to the UE Category parameter which is able to indicate the buffer size of the terminal, the maximum number $N_{Softbits}$ of soft bits which are able to be occupied by the TB, obtain the minimum number $CB_{num}$ of code blocks included in the TB $CB_{Num} = \lceil N_{tb}/N_{cb} \rceil$ according to the obtained physical channel resource parameter which may include the number $N_{tb}$ of OFDM symbols occupied by the TB in a time domain and the maximum number $N_{cb}$ of OFDM symbols allowed to be occupied by each code block in the time domain, and obtain the reference information block length $K_R$ based on a following formula:

$$K_R = \left\lceil \frac{N_{Softbits}}{CP_{Num}} \cdot R \right\rceil.$$

The determining unit may be configured to determine a maximum information block length according to the reference information block length and the hardware parameter.

The hardware parameter may include at least one of: a maximum information block length $K_{encoder}$ supported by the encoder, and a set $\{K\}_{interleaver}$ of information block lengths supported by an encoder.

The determining unit may be configured to determine the maximum information block length according to the reference information block length and the hardware parameter in a following manner.

When an encoding method of the TB is the convolutional code, the maximum information block length $K_{max}$ may be determined based on a following formula:

$$K_{max} = \min(K_R, K_{encoder});$$

When the encoding method of the TB is the Turbo code, that the maximum information block length $K_{max}$ is determined may include the following acts.

When the reference information block length $K_R$ is less than the maximum information block length $K_{encoder}$ supported by the encoder, an information block length which is greater than or equal to the reference information block length $K_R$ of the code block and is closest to the reference information block length $K_R$ may be selected from the set $\{K\}_{interleaver}$ of information block lengths supported by the encoder as the maximum information block length $K_{max}$ of the code block.

When the reference information block length $K_R$ is greater than or equal to the maximum information block length $K_{encoder}$ supported by the encoder, the maximum information block length $K_{encoder}$ supported by the encoder may be selected as the maximum information block length $K_{max}$ of the code block.

In the embodiment, the function min ( ) means selecting a minimum value.

The hardware parameter may include at least one of: a maximum information block length $K_{encoder}$ supported by the encoder, and a set $\{K\}_{interleaver}$ of information block lengths supported by an encoder.

The determining unit may be configured to determine the maximum information block length according to the reference information block length and the hardware parameter in the following manner.

When an encoding method of the TB is the convolutional code, the maximum information block length $K_{max}$ may be determined based on a following formula:

$$K_{max} = \min(K_R, K_{encoder}).$$

When the encoding method of the TB is the Turbo code, the maximum information block length $K_{max}$ may be determined based on a following formula:

$$K_{max} = \begin{cases} \underset{\hat{K} \geq K_R, \hat{K} \in \{K_{interleaver}\}}{\text{argmin}} (\hat{K} - K_R), & K_R < K_{encoder} \\ K_{encoder}, & K_R \geq K_{encoder} \end{cases}.$$

The apparatus of the disclosure may further include: an obtaining unit, which may be configured to obtain at least one of the division related parameter and the hardware parameter through one or more of the transmission mode indication, the DCI format and the RNTI.

The apparatus of the disclosure may further include: an indicating unit, which may be configured to obtain the maximum information block length $K_{max}$ through any one or more of the transmission mode indication, the DCI format and the RNTI.

The dividing unit may be configured to divide the TB having a length greater than the maximum information block length into two or more code blocks according to the obtained division related parameter, the hardware parameter and the determined maximum information block length.

The information block length after the code block division may be less than the determined maximum information block length.

The division related parameter may further include a size B of the TB and a length L of the CRC of each code block.

The hardware parameter may at least include: a set $\{K\}_{interleaver}$ of information block lengths supported by an encoder.

The dividing unit may be configured to, determine the number C of divided code blocks according to the size B of the TB, the length L of the CRC of each code block and the maximum information block length $K_{max}$;

determine an information block length of each code block according to the set $\{K\}_{interleaver}$ of information block lengths supported by the encoder, the number C of code blocks, the size B of the TB and the length L of the CRC of each code block, and perform the code block division according to the determined information block length of each code block.

The dividing unit may be configured to, determine the number C of divided code blocks based on a following formula $$C = \left\lceil \frac{B}{K_{max} - L} \right\rceil;$$

where $\lceil x \rceil$ means rounding up X to an integer, determine an information block length of each code block according to the set $\{K\}_{interleaver}$ of information block lengths supported by the encoder, the number C of code blocks, the size B of the TB and the length L of the CRC of each code block, and perform the code block division according to the determined information block length of each code block.

The dividing unit may be configured to, determine the number C of divided code blocks according to the size B of the TB, the length L of the CRC of each code block and the maximum information block length $K_{max}$.

When the size B of the TB is able to be divided evenly by $(K_{max}-L)$ or the number C of code blocks, the information block length of each code block may be B/C.

When the size B of the TB is not able to be divided evenly by $(K_{max}-L)$ or the number C of code blocks, the C code blocks may be divided into first type of code blocks and second type of code blocks with different code block information block lengths.

A code block information block length $K_I$ of the first type of code blocks may be a minimum K value, satisfying that a product of the number C of code blocks and the code block information block length $K_I$ of the first type of code blocks is greater than or equal to the size B of the TB, in the set $\{K\}_{interleaver}$ of information block lengths supported by the encoder.

A code block information block length $K_{II}$ of the second type of code blocks may be a maximum K value, satisfying that the code block information block length $K_{II}$ of the second type of code blocks is less than the code block information block length Ku of the first type of code blocks, in the set $\{K\}_{interleaver}$ of information block lengths supported by the encoder.

The dividing unit may be configured to perform the code block division according to the determined information block length of each code block.

The dividing unit may be configured to, determine the number C of divided code blocks according to the size B of the TB, the length L of the CRC of each code block and the maximum information block length $K_{max}$.

When the size B of the TB is able to be divided evenly by ($K_{max}$−L) or the number C of code blocks, the information block length of each code block may be B/C.

When the size B of the TB is not able to be divided evenly by ($K_{max}$−L) or the number C of code blocks, the C code blocks may be divided into first type of code blocks and second type of code blocks with different code block information block lengths.

The dividing unit may be configured to compute the code block information block length $K_I$ of the first type of code blocks based on a following formula:

$$K_I = \underset{K \geq \lceil \frac{B}{C} \rceil, K \in \{K\}_{interleaver}}{\operatorname{argmin}} \left(K - \lceil \frac{B}{C} \rceil\right),$$

and compute the code block information block length $K_{II}$ of the second type of code blocks based on a following formula:

$$K_{II} = \underset{K_I, K_{II} \in \{K\}_{interleaver}, K_{II} < K_I}{\operatorname{argmin}} (K_I - K_{II}).$$

The number $C_I$ of the first type of code blocks and the number $C_{II}$ of the second type of code blocks may satisfy:

$$C_{II} = \left\lfloor \frac{C \cdot K_I - (B + C \cdot L)}{K_I - K_{II}} \right\rfloor,$$

where $C_I = C - C_{II}$.

The dividing unit may be configured to perform the code block division according to the determined information block length of each code block.

The apparatus of the disclosure may further include: a setting unit, which may be configured to, after the dividing unit completes the code block division, set the former $C_{II}$ code blocks as the second type of code blocks, and set the latter $C_I$ code blocks as the first type of code blocks.

The apparatus of the disclosure may further include: a cascading unit, which may be configured to respectively perform CRC adding, channel encoding and rate matching on each divided code block to obtain a corresponding encoded code block, and perform code block cascading to obtained encoded code blocks.

The apparatus of the disclosure may further include: a checking unit, which may be configured to perform the block encoding to two or more than two divided code blocks to generate the check data block.

The apparatus of the disclosure may further include: a deleting unit, which may be configured to delete a part of bits at any position of each encoded code block and a part of bits at any position of each check data block generated by performing the block encoding.

A size of the part of bits may be computed through the following acts.

A sum of numbers of bits of all encoded code blocks and all check data blocks generated by performing the block encoding, and a sum of numbers of bits of all the encoded code blocks before the block encoding may be computed.

The sum of the numbers of bits of all the encoded code blocks before the block encoding may be subtracted from the sum of the numbers of bits of all the encoded code blocks and all the check data blocks generated by performing the block encoding to obtain the bit number difference value.

The number of encoded code blocks may be added to the number of check data blocks generated by performing the block encoding to obtain a sum of information blocks.

The quotient obtained by dividing the obtained bit number difference value by the sum of obtained information blocks may be used as the size of the part of bits.

The apparatus of the disclosure may further include: a check cascading unit, which may be configured to perform the code block cascading on the encoded code blocks from which the part of bits has been deleted and the check data blocks generated by performing the block encoding from which the part of bits has been deleted.

The code block cascading may include: connecting in series bits of the encoded code blocks from which the part of bits has been deleted and bits of the check data blocks generated by performing the block encoding from which the part of bits has been deleted, and putting the check data blocks generated by performing the block encoding from which the part of bits has been deleted behind the encoded code blocks from which the part of bits has been deleted.

The method of the disclosure is elaborated below through embodiments.

Embodiment 1

In a communication system based on the 3GPP LTE and LTE-A technology, a first transmission node may send a TB with a length of B bits to a second transmission node, and compute the maximum number $N_{RE}N_{cb} \times N_{subcarrier}$ of REs allowed to be occupied by each code block according to the maximum number $N_{cb}$ of OFDM symbols allowed to be occupied by each code block in the time domain and the number $N_{subcarrier}$ of frequency-domain subcarriers occupied by the transmission signal included in the division related parameter.

The first information block length $K_R = N_{RE} \times M \times R \times N_{layer}$ of the code block may be determined according to the maximum number $N_{RE}$ of REs allowed to be occupied by each code block, the modulation scheme M of the transmission signal, the coding rate R of the TB, and the number $N_{layer}$ of spatial layers occupied by the transmission signal.

The maximum information block length may be determined according to the maximum information block length $K_{encoder}$ supported by the encoder, the set $\{K\}_{interleaver}$ of information block lengths supported by the encoder and the first information block length $K_R$. The maximum information block length $K_{encoder}$ may be the maximum element in the set $\{K\}_{interleaver}$ of information block lengths supported by the encoder.

As an exemplary embodiment, the first information block length $K_R$ may be compared with the maximum information block length $K_{encoder}$ supported by the encoder, min $(N_{cb} \cdot N_{RB} \cdot N_{SP} \cdot M \cdot R \cdot N_{layer}, K_{encoder})$.

The maximum information block length $K_{max}$ may be determined based on a following formula:

$$K_{max} = \operatorname*{argmin}_{\hat{K} \geq K_{one}, \hat{K} \in \{K\}_{interleaver}} (\hat{K} - \min(N_{cb} \cdot N_{RB} \cdot N_{SP} \cdot M \cdot R \cdot N_{layer}, K_{encoder}));$$

where $K_R = N_{cb} \cdot N_{RB} \cdot N_{SP} \cdot M \cdot R \cdot N_{layer}$.

When the size B of the TB is greater than $K_{max}$, the TB may be divided into multiple code blocks.

The number C of divided code blocks may be determined according to the size B of the TB, the length L of the CRC of each code block and the maximum information block length $K_{max}$.

In the present embodiment, B is able to be divided evenly by $(K_{max}-L)$, where the number C of code blocks may be expressed as the following form:

$$C = \frac{B}{K_{max} - L},$$

the information block length of each code block may be B/C.

In an exemplary embodiment, the channel encoding and the rate matching may be performed to C code blocks after the code block division performed to the TB to obtain C encoded code blocks, and then the code block cascading may be performed to the C encoded code blocks.

Figure 8:
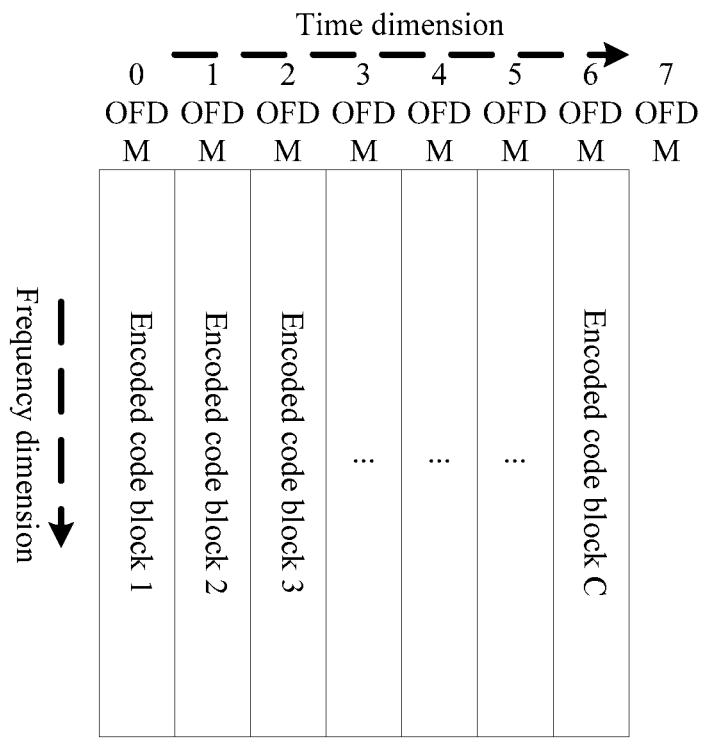
FIG. 8 is a schematic diagram of code block division according to the first embodiment of the disclosure.

FIG. 8 is a schematic diagram of code block division according to the first embodiment of the disclosure. As shown in FIG. 8, any code block may be allowed to occupy, in the time domain, 1 OFDM symbol, that is, $N_{cb}=1$, then each code block is limited, in the time domain, to not exceeding time length of 1 OFDM symbol. A receiving node may immediately start to decode after receiving a code block. Note that, the $N_{cb}$ may also be greater than 1. Generally, if the service is more sensitive to the time delay, the value of the $N_{cb}$ may be smaller (the smallest value is 1); and if the service is not sensitive to the time delay, the value of the $N_{cb}$ may be greater. As such, the control the transmission node has over the time delay may be enhanced by adjusting the $N_{cb}$, which may be especially applicable to communication scenarios with super real time and variable time delay.

Embodiment 2

In the communication system based on the 3GPP LTE and LTE-A technology, the first transmission node may send the TB with a length of B bits to the second transmission node, and determine, according to the size B of the TB, the length L of the CRC of each code block, the number $N_{tb}$ of OFDM symbols occupied by the TB in a time domain and the maximum number $N_{cb}$ of OFDM symbols allowed to be occupied by each code block in the time domain included in the division related parameter, the second information block length KR as:

$$K_R = B \cdot \frac{N_{cb}}{N_{tb}} + L.$$

The maximum information packet length $K_{max}$ may be determined according to the maximum information block length $K_{encoder}$ supported by the encoder and the set $\{K\}_{interleaver}$ of information block lengths supported by the encoder. The maximum information packet length $K_{max}$ may be the maximum element in the set $\{K\}_{interleaver}$ of information block lengths supported by the encoder.

The maximum information packet length $K_{max}$ may be determined based on a following formula $$K_{max} = \operatorname*{argmin}_{\hat{K} \geq K_B, \hat{K} \in \{K_{interleaver}\}} (\hat{K} - \min(K_R, K_{encoder})).$$

When the size B of the TB is greater than $K_{max}$, the TB may be divided into multiple code blocks.

The number C of divided code blocks may be determined according to the size B of the TB, the length L of the CRC of each code block and the maximum information block length $K_{max}$.

In the present embodiment, B is not able to be divided evenly by $(K_{max}-L)$. The number C of code blocks may be expressed as the following form:

$$C = \left\lceil \frac{B}{K_{max} - L} \right\rceil;$$

where $\lceil x \rceil$ means rounding up X to an integer.

An information block length of each code block may be determined according to the set $\{K\}_{interleaver}$ of information block lengths supported by the encoder.

When the size B of the TB is not able to be divided evenly by $(K_{max}-L)$ or the number C of code blocks, the C code blocks may be divided into first type of code blocks and second type of code blocks with different code block information block lengths.

A code block information block length $K_I$ of the first type of code blocks may be a minimum K value, satisfying that a product of the number C of code blocks and the code block information block length $K_I$ of the first type of code blocks is greater than or equal to the size B of the TB, in the set $\{K\}_{interleaver}$ of information block lengths supported by the encoder.

A code block information block length $K_{II}$ of the second type of code blocks may be a maximum K value, satisfying that the code block information block length $K_{II}$ of the second type of code blocks is less than the code block information block length $K_I$ of the first type of code blocks, in the set $\{K\}_{interleaver}$ of information block lengths supported by the encoder.

In an exemplary embodiment, the code block information block length Ku of the first type of code blocks may be:

$$K_I = \underset{K \geq \lceil \frac{B}{C} \rceil, K \in \{K\}_{interleaver}}{\operatorname{argmin}} \left(K - \lceil \frac{B}{C} \rceil\right).$$

The code block information block length $K_{II}$ of the second type of code blocks may be:

$$K_{II} = \underset{K_I, K_{II} \in \{K\}_{interleaver}, K_{II} < K_I}{\operatorname{argmin}} (K_I - K_{II}).$$

The number $C_I$ of the first type of code blocks and the number $C_{II}$ of the second type of code blocks may satisfy:

$$C_{II} = \left\lfloor \frac{C \cdot K_I - (B + C \cdot L)}{K_I - K_{II}} \right\rfloor,$$

where $C_I = C - C_{II}$.

In an exemplary embodiment, the channel encoding and the rate matching may be performed to C code blocks after the code block division performed to the TB to obtain C encoded code blocks, and then the code block cascading may be performed to the C encoded code blocks. The former $C_{II}$ code blocks may be set as the second type of code blocks, and the latter $C_I$ code blocks may be set as the first type of code blocks.

Figure 9:
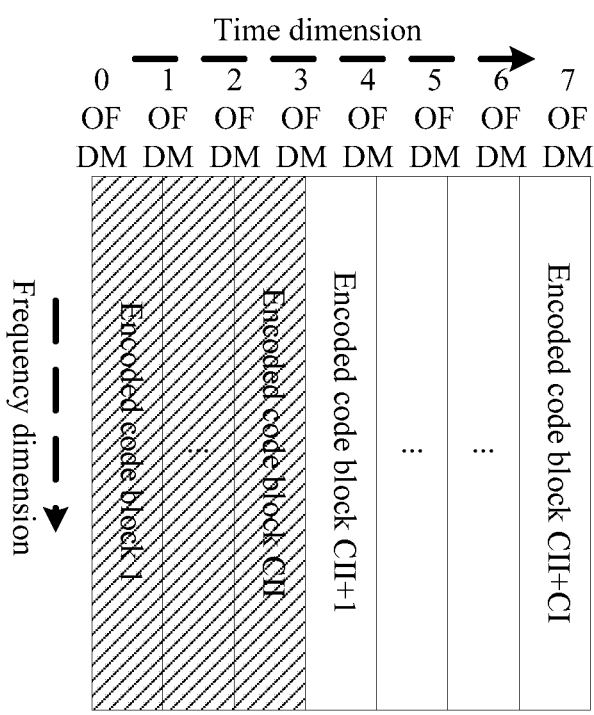
FIG. 9 is a schematic diagram of code block division according to the second embodiment of the disclosure.

FIG. 9 is a schematic diagram of code block division according to the second embodiment of the disclosure. In the figure, the code blocks shown by the pane with left oblique lines is the second type of code blocks. The present embodiment may achieve controlling the time delay by limiting the number of OFDM symbols occupied by each code block in the time domain. At the same time, the method for code block division provided by the present embodiment may be used for coping with the situation where the length of the TB cannot be evenly divided by the number of code blocks.

Embodiment 3

The difference between this present embodiment and embodiment 1 and embodiment 2 is that: the maximum number Nib of OFDM symbols allowed to be occupied by each code block in the time domain is indicated by the transmission mode.

For example, the system may define new transmission modes A, B and C which respectively indicate three transmission modes aiming at the scenarios with different requirements on the time delay. The transmission mode A has the highest requirement on the time delay, and the number of OFDM symbols occupied by a single code block cannot be greater than 1. The transmission mode B has the second highest requirement on the time delay, and the number of OFDM symbols occupied by a single code block cannot be greater than 3. The transmission mode C has the lowest requirement on the time delay, and the number of OFDM symbols occupied by a single code block cannot be greater than 14.

The base station may configure the transmission modes A, B and C semi-statically through high-level signaling; that is, the transmission mode may implicitly indicate the maximum number of OFDM symbols occupied by a single code block.

Embodiment 4

Compared with embodiment 3, the maximum information block length $K_{max}$ of the code block is indicated by the transmission mode in the present embodiment.

Embodiment 5

The difference between this present embodiment and embodiment 3 is that: the maximum number $N_{cb}$ of OFDM symbols allowed to be occupied by each code block in the time domain is indicated by the DCI format.

For example, the system may define the DCI formats X, Y, and Z which respectively indicate three transmission modes aiming at the scenarios with different requirements on the time delay. The DCI format X has the highest requirement on the time delay, and the number of OFDM symbols occupied by a single code block cannot be greater than 1. The DCI format Y has the second highest requirement on the time delay, and the number of OFDM symbols occupied by a single code block cannot be greater than 3. The DCI format Z has the lowest requirement on the time delay, and the number of OFDM symbols occupied by a single code block cannot be greater than 14.

The DCI format may be sent by the base station to a relay or a terminal through the PDCCH; or the DCI format may be sent to the terminal by the relay.

Embodiment 6

The difference between this present embodiment and embodiment 5, the maximum information block length $K_{max}$ of the code block is indicated by the DCI format.

Embodiment 7

The difference between this present embodiment and embodiment 5 is that: the maximum number $N_{cb}$ of OFDM symbols allowed to be occupied by each code block in the time domain is implicitly indicated by the RNTI.

For example, the system may define three RNTIs 1, 2, and 3 which respectively indicate three transmission modes aiming at the scenarios with different requirements on the time delay. The RNTI 1 has the highest requirement on the time delay, and the number of OFDM symbols occupied by a single code block cannot be greater than 1. The RNTI 2 has the second highest requirement on the time delay, and the number of OFDM symbols occupied by a single code block cannot be greater than 3. The RNTI 3 has the lowest requirement on the time delay, and the number of OFDM symbols occupied by a single code block cannot be greater than 14;

The RNTI may be allocated to the relay or the terminal by the base station, or may be allocated to the terminal by the relay. In addition, the RNTI may be used for scrambling the PDCCH.

Embodiment 8

The difference between this present embodiment and embodiment 7 is that: the maximum information block length $K_{max}$ of the code block is indicated by the RNTI.

Embodiment 9

The difference between this present embodiment and embodiment 1 or 2 is that: the maximum information block length $K_{max}$ may be determined according to the UE Category parameter which is able to indicate the buffer size of the terminal, the number $N_{tb}$ of OFDM symbols occupied by the TB in a time domain, the maximum number $N_{cb}$ of OFDM symbols allowed to be occupied by each code block in the time domain, and the coding rate R.

In an exemplary embodiment, the maximum number $N_{Softbits}$ of soft bits which are able to be occupied by the TB may be obtained according to the UE Category parameter which is able to indicate the buffer size of the terminal. According to the number $N_{tb}$ of OFDM symbols occupied by the TB in a time domain and the maximum number $N_{cb}$ of OFDM symbols allowed to be occupied by each code block in the time domain, the minimum number $CB_{num}$ of code blocks included in the TB may be obtained based on a following formula: $CB_{Num}=\lceil N_{tb}/N_{cb} \rceil$.

The reference information block length $K_R$ may be obtained based on a following formula:

$$K_R = \left\lceil \frac{N_{Softbits}}{CB_{Num}} \cdot R \right\rceil.$$

When an encoding method of the TB is the convolutional code, $K_{max}=K_R$.

When the encoding method of the TB is the Turbo code, the maximum information block length $K_{max}$ may be determined according to the maximum information block length $K_{encoder}$ supported by the encoder and the set $\{K\}_{interleaver}$ of information block lengths supported by the encoder.

When the encoding method of the TB is the convolutional code, the maximum information block length $K_{max}$ may be determined based on a following formula:

$$K_{max}=\min(K_R, K_{encoder}).$$

When the encoding method of the TB is the Turbo code, the maximum information block length $K_{max}$ may be determined based on a following formula:

$$K_{max} = \underset{\hat{K} \geq K_R, \hat{K} \in \{K_{interleaver}\}}{\operatorname{argmin}} (\hat{K} - K_R).$$

Embodiment 9

Compared with embodiment 1 and embodiment 2, in the present embodiment:

the channel encoding and the rate matching may be performed to C code blocks after the code block division to obtain C encoded code blocks, and then the bit or symbol with the same index position in each encoded code block is encoded to generate S check data blocks;

a part of bits in the C encoded code blocks and the S check data blocks may be deleted, so that the sum of bits of the C encoded code blocks and the S check data blocks may be equal to the sum of bits of the C encoded code blocks before the block encoding;

the code block cascading may be performed to the C encoded code blocks from which a part of bits have been deleted and the S check data blocks from which a part of bits have been deleted. The code block cascading may include: connecting in series the bits of each code block, and the S check data blocks from which a part of bits have been deleted are put behind the C encoded code blocks from which a part of bits have been deleted.

Figure 10:
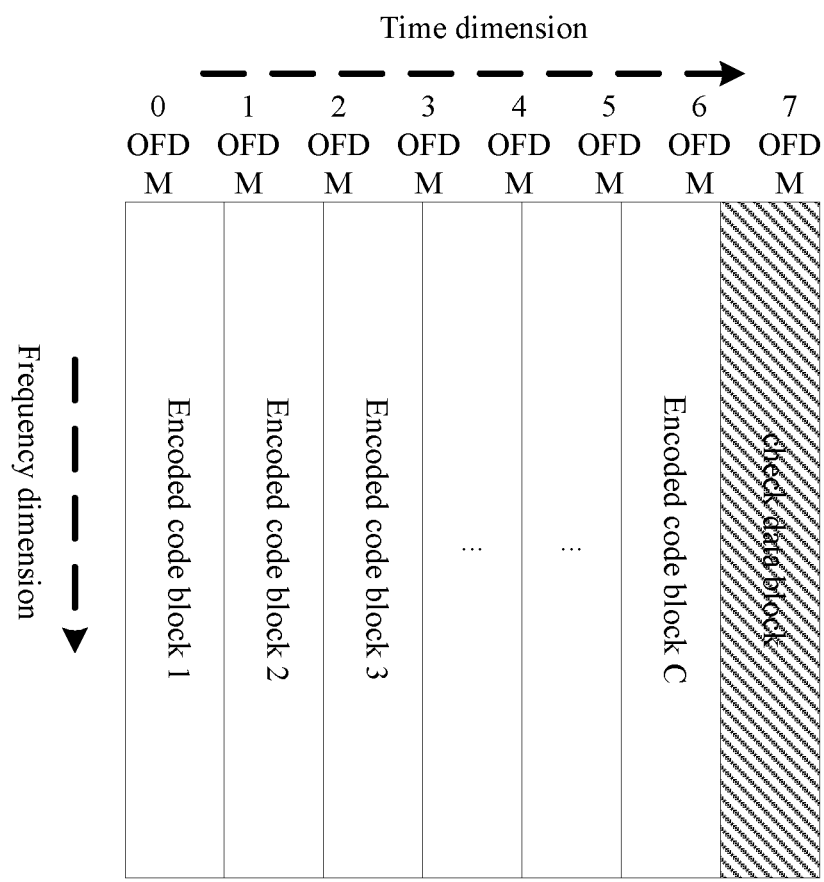
FIG. 10 is a schematic diagram of code block division according to the ninth embodiment of the disclosure.

FIG. 10 is a schematic diagram of code block division according to the ninth embodiment of the disclosure. As shown in FIG. 10, the check data blocks shown by the pane with right oblique lines is generated through the block encoding. By means of the processing of the present embodiment, the whole performance of the TB may be ensured.

Those of ordinary skill in the art may understand that all or part of the acts in the method may be completed by instructing related hardware (e.g., processor) through a program. The program may be stored in computer-readable storage media, such as a read-only memory, a magnetic disk or a compact disc. In an exemplary embodiment, all or part of the acts in the embodiments may also be implemented by one or more integrated circuits. Correspondingly, each module/unit in the embodiments may be implemented in form of hardware, for example, its corresponding function is implemented through an integrated circuit. Each module/unit in the embodiments may also be implemented in form of software function module, for example, its corresponding function is implemented by a processor executing a program/instruction stored in the memory. The disclosure is not limited to any particular combination of hardware and software.

Although the disclosed implementations of the disclosure are described above, the contents are the implementations adopted only for facilitating understanding of the disclosure and not intended to limit the disclosure. Those skilled in the art may make any modification and variation to the implementation forms and details without departing from the scope of the disclosure, but the scope of patent protection of the disclosure is still subject to the scope defined by the appended claims.

INDUSTRIAL APPLICABILITY

The technical solutions of some embodiments of the disclosure may reduce the delay brought by the code block division to a system, avoid influences on the work of the system due to the delay caused by the code block division, and improve system performance.

The invention claimed is:

1. A method of code block division, comprising:
determining a maximum information block length of a code block according to a plurality of division related parameters associated with a Transport Block (TB),
wherein the plurality of division related parameters includes physical channel resource parameters that describe a number of symbols and a number of subcarriers associated with the TB, and a plurality of spectral efficiency parameters that describe encoding parameters for the TB,
wherein the plurality of spectral efficiency parameters include a modulation scheme (M) of a transmission signal that includes the TB, a coding rate (R) of the TB, and a number ($N_{layer}$) of spatial layers occupied by the transmission signal; and
dividing the TB having a size greater than the maximum information block length into two or more code blocks, wherein a number of the two or more code blocks is determined according to the maximum information block length, the size of the TB, and a length of cyclic redundancy check (CRC) bits of each code block,
wherein an information length of each of the two or more code blocks after the dividing the TB is determined according to a set of information block lengths supported by an encoder, the number of the two or more code blocks, the size of the TB and the length of the CRC bits of each code block.

2. The method of claim 1, wherein the physical channel resource parameters comprise a number ($N_{tb}$) of Orthogonal Frequency Division Multiplexing (OFDM) symbols occupied by the TB in a time domain.

3. The method of claim 1, wherein the physical channel resource parameters comprise a number ($N_{subcarrier}$) of frequency-domain subcarriers occupied by the transmission signal that includes the TB.

4. The method of claim 1, wherein the information length of each of the two or more code blocks after the dividing the TB is less than the maximum information block length.

5. A wireless communication apparatus, comprising a processor configured to:
   determine a maximum information block length of a code block according to a plurality of division related parameters associated with a Transport Block (TB),
      wherein the plurality of division related parameters includes physical channel resource parameters that describe a number of symbols and a number of subcarriers associated with the TB, and a plurality of spectral efficiency parameters that describe encoding parameters for the TB,
      wherein the plurality of spectral efficiency parameters include a modulation scheme (M) of a transmission signal that includes the TB, a coding rate (R) of the TB, and a number ($N_{layer}$) of spatial layers occupied by the transmission signal; and
   divide the TB having a size greater than the maximum information block length into two or more code blocks, wherein a number of the two or more code blocks is determined according to the maximum information block length, the size of the TB, and a length of cyclic redundancy check (CRC) bits of each code block,
   wherein an information length of each of the two or more code blocks after the TB is divided is determined according to a set of information block lengths supported by an encoder, the number of the two or more code blocks, the size of the TB and the length of the CRC bits of each code block.

6. The wireless communication apparatus of claim 5, wherein the physical channel resource parameters comprise a number ($N_{tb}$) of Orthogonal Frequency Division Multiplexing (OFDM) symbols occupied by the TB in a time domain.

7. The wireless communication apparatus of claim 5, wherein the physical channel resource parameters comprise a number ($N_{subcarrier}$) of frequency-domain subcarriers occupied by the transmission signal that includes the TB.

8. The wireless communication apparatus of claim 5, wherein the information length of each of the two or more code blocks after the TB is divided is less than the maximum information block length.

9. A non-transitory computer readable storage media comprising instructions for code block division, wherein the instructions configure a processor to perform a method comprising:
   determining a maximum information block length of a code block according to a plurality of division related parameters associated with a Transport Block (TB),
      wherein the plurality of division related parameters includes physical channel resource parameters that describe a number of symbols and a number of subcarriers associated with the TB, and a plurality of spectral efficiency parameters that describe encoding parameters for the TB,
      wherein the plurality of spectral efficiency parameters include a modulation scheme (M) of a transmission signal that includes the TB, a coding rate (R) of the TB, and a number ($N_{layer}$) of spatial layers occupied by the transmission signal; and
   dividing the TB having a size greater than the maximum information block length into two or more code blocks, wherein a number of the two or more code blocks is determined according to the maximum information block length, the size of the TB, and a length of cyclic redundancy check (CRC) bits of each code block,
   wherein an information length of each of the two or more code blocks after the dividing the TB is determined according to a set of information block lengths supported by an encoder, the number of the two or more code blocks, the size of the TB and the length of the CRC bits of each code block.

10. The non-transitory computer readable storage media of claim 9, wherein the physical channel resource parameters comprise a number ($N_{tb}$) of Orthogonal Frequency Division Multiplexing (OFDM) symbols occupied by the TB in a time domain.

11. The non-transitory computer readable storage media of claim 9, wherein the physical channel resource parameters comprise a number ($N_{subcarrier}$) of frequency-domain subcarriers occupied by the transmission signal that includes the TB.

12. The non-transitory computer readable storage media of claim 9, wherein the information length of each of the two or more code blocks after the dividing the TB is less than the maximum information block length.

* * * * *